Patented Sept. 26, 1950

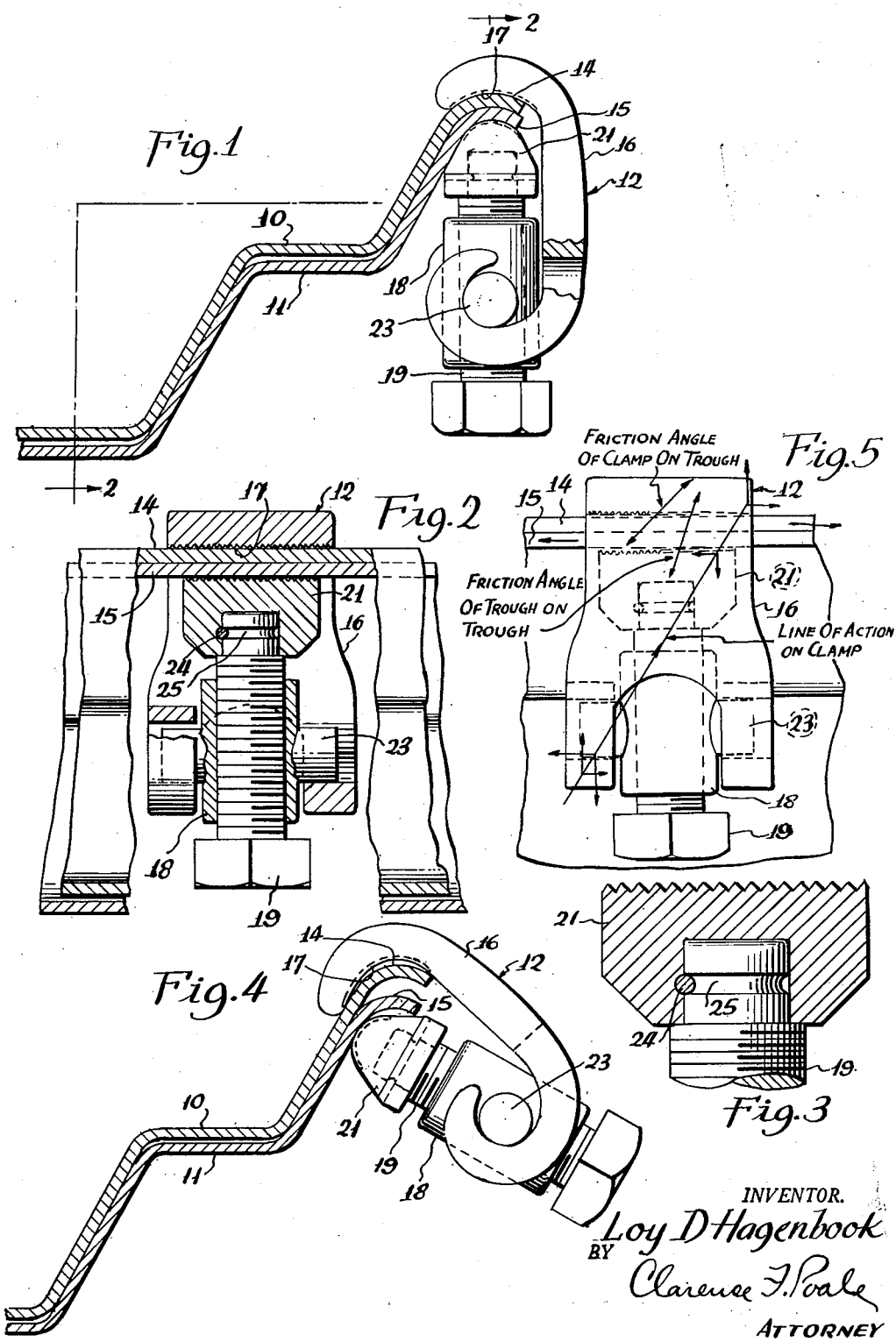

2,523,293

UNITED STATES PATENT OFFICE 2,523,293

SHAKER CONVEYER CLAMP

Loy D. Hagenbook, Chicago, Ill., assignor to Goodman Manufacturing Company, Chicago, Ill., a corporation of Illinois Application December 30, 1947, Serial No. 794,741

6 Claims. (Cl. 198—220)

This invention relates to improvements in shaker conveyors and more particularly relates to an improved clamping means for clamping the telescopic troughs of a shaker conveyor together without deforming the troughs.

Heretofore, shaker conveyors having extensible pick-up shovels on their receiving ends, have been provided with two telescopic troughs in the trough line to permit extension of the trough line without inserting an additional trough in the trough line, so that the pick-up shovel on the forward end of the trough line may be extended for the length of the trough on which it is mounted and the length of the telescopic trough. These telescopic troughs have been held together by various types of gripping devices and by C-clamps of various forms. C-clamps have proved to be the most common way of connecting said telescopic troughs together, but are objectionable in that they are rigid and when tightened tight enough to positively hold the troughs together, deform the edges of the troughs to the extent that they impair the strength thereof, and do not easily open up wide to quickly and easily go over the two pans that are sprung apart and then be rapidly moved into engagement with the two troughs.

The principal objects of my present invention are to provide a novel and efficient form of clamping device for the telescopic troughs of a shaker conveyor, so designed as to readily go over the two troughs and quickly draw them together, and when connected, to permit a small slip between the troughs when subjected to impact blows, as when the shovel on the forward end of a trough line engages an obstruction, but which will recover and restore the troughs to their initial positions when the impact load ceases.

A more specific object of my invention is to provide a novel form of spring clamping device which will positively grip the surfaces of adjacent nested troughs of a shaker conveyor trough line with a vise-like grip without deforming them, and will permit a slight amount of slippage between the troughs when subjected to impact blows, but which will return the troughs to their initial positions upon removal of the impact loads.

These and other objects of my invention will appear from time to time as the following specification proceeds and with reference to the accompanying drawings wherein:

Figure 1 is a fragmentary transverse sectional view taken through two telescopic troughs of a shaker conveyor trough line and illustrating one form of clamping device constructed in accordance with my invention;

Figure 2 is a fragmentary sectional view taken substantially along line 2—2 of Figure 1;

Figure 3 is a fragmentary sectional view showing certain details of the lower clamping jaw of the clamping device;

Figure 4 is a view somewhat similar to Figure 1, but showing the clamping device initially applied to clamp the troughs together; and Figure 5 is a side view of the clamping device shown in Figure 1, showing its position when an impact blow has been placed on the trough line and one trough has slightly slipped along the other.

In the embodiment of my invention illustrated in the drawings, a portion of a telescopic trough 10 is shown as being nested within a trough 11, and a yieldable C-clamp 12 is shown as engaging the edges of said troughs, on one side thereof, for connecting one side of said troughs together, it being understood that at least two of said clamps are used to connect said troughs together, one being at each side thereof. Said troughs may be of a well known form commonly used in shaker conveyors and, as herein shown, have upper curved outer edges 14 and 15 respectively, extending along opposite sides thereof, which edges are adapted to be engaged by and clamped together by said clamping device.

The clamping device 12 is herein shown as including a substantially C-shaped spring member 16 having a jaw 17 at the inside of one of its ends, which is adapted to engage the upper side of the curved edge 14. The opposite end of said spring member forms a trunnion mounting for a threaded sleeve 18 having a screw 19 threaded therein and having a clamping jaw 21 on its outer end. Said spring member 16 may be made from spring steel which will yield and permit a slight amount of slippage between the troughs upon a shock load thereon, and which will bring said troughs back to their initial position when the shock loads are removed.

The jaw 17 is knurled to provide a surface of high friction of a greater coefficient of friction than the friction between the troughs, which will bite said curved surface like a vise jaw, but which will not deform it. The lower portion of said member 16 is bifurcated and the lower ends of the furcations of said bifurcated portion are curved upwardly and inwardly and form an open bearing support for trunnion pins 23, 23, projecting outwardly from the sleeve 18. Said nut extends between the furcations of said lower portion of said C-clamp and said open bearing permits a slight amount of rocking movement of said trunnion pins about an axis extending transversely thereof, upon yielding of said spring member, as when one trough slips slightly with respect to the other.

The jaw 21 is mounted on the upper end of the screw 19 for pivotal movement about the axis of turning movement of said screw and is held thereto, as by a pin 24 extending through said jaw and engaging a recessed portion 25 of said screw. Said jaw has a curved engaging surface adapted to conform to and to engage the underside of the curved edge 15. Said engaging surface of said jaw may likewise be knurled so as to provide a surface of a greater coefficient of friction than that between the troughs, which will bite the undersurface of the curved edge 15, but will not deform it.

In clamping the troughs together, the jaw 17 is first engaged with the curved edge 14, and the spring member 16 is positioned in an upwardly and outwardly extended position with respect to the troughs 10 and 11, as shown in Figure 4. The jaw 21 may then be engaged with an outer side of the trough 11 and the screw 19 may be turned in a clockwise direction to positively engage said jaw 21 with the outer side of said trough 11, and clamp said troughs together. As said screw is tightened, the outer end of said spring member will move downwardly by the clamping action of said jaws on said troughs, until said jaw 21 comes into the position shown in Figure 1. Said screw may then be further tightened to firmly clamp said troughs together.

In Figure 5 the clamping device is diagrammatically shown in the position it will assume when sudden impact blows are encountered. This figure also shows the approximate friction angle of the jaws on the trough and the approximate friction angle of the troughs on each other. It further shows the line of action of the clamp as being intermediate the line of action of the friction of the troughs on each other and the line of action of the upper and lower jaws on the troughs. When this condition arises, and as the troughs slip slightly with respect to each other, the jaw 21 and sleeve 18 will tilt about the left-hand trunnion pin against the action of the spring member 16. This will increase the clamping action of said jaws 21 and 17. When the impact load ceases, said spring member will slip the troughs back towards their initial position, due to the spring action of said spring member and the fact that the friction of the jaws on the troughs is greater than the friction between the troughs, as is represented by the line of action of this member in this figure. Upon reversal of the direction of movement of the pan line and the reversal in the direction of the forces on said clamp, said spring member will move the two troughs further to their initial position, and said jaws 17 and 21 will return to the initial gripping positions shown in Figures 1 and 2 and move said troughs therewith.

It may be seen from the foregoing that the troughs may slip a slight amount with respect to each other when they encounter an impact load, due to the fact that the friction of the troughs is less than the friction of the jaws 17 and 21 on said troughs, and that when the impact load ceases, the clamp may return itself and said troughs towards their initial positions and may completely return itself and said troughs to their initial positions upon a light reversal of the load, and that this ability of said clamp to restore itself to its initial position after an impact load has been encountered by the troughs, determines the ability of said clamping device to efficiently hold.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyor and in combination with a pair of telescopic troughs one of which is nested within the other, means for clamping said troughs together including a spring member of a substantially C-shaped formation having jaws at its opposite ends one of which is movable with respect to the other, means for moving said movable jaw to engage said jaws with the edges of said troughs and to hold them in connected relation with respect to each other, the engaging surfaces of said jaws being formed to engage said troughs with a vise-like grip of a greater coefficient of friction than the coefficient of friction between said troughs, to permit said troughs to slip when impact loads are encountered, and said movable jaw being relatively loosely mounted on said spring member and being movable against the spring thereof upon slipping of said troughs, and the elasticity of said spring member restoring said troughs to their initial positions upon reversal of the load thereon.

2. In a shaker conveyor and in combination with a pair of telescopic troughs one of which is nested within the other, means for clamping said troughs together including a yieldable elastic member having a rigid jar at one of its ends adapted to engage the upper edge of one trough, and having a pivotally mounted jaw adapted to engage the underside of the edge of the next adjacent trough and clamp said troughs together, and the pivotal connection between said last mentioned jaw and said yieldable member being such as to permit said pivoted jaw to tilt against the elasticity of said member in a direction transverse to its axis of pivotal movement and increase the clamping action of said jaws, when said troughs tend to slip with respect to each other when heavy impact loads are encountered by said troughs, and the elasticity of said member serving to move said troughs towards their initial positions upon removal of said impact load.

3. In a shaker conveyor and in combination with a pair of telescopic troughs one of which is nested within the other, means for clamping said troughs together including a yieldable elastic substantially C-shaped member having a jaw formed on the underside of its upper end and adapted to engage the upper edge of one trough, and having another jaw pivotally mounted adjacent its opposite end, for movement with respect thereto about an axis extending longitudinally of said troughs, means for moving said last mentioned jaw into clamping engagement with the underside of the edge of the next adjacent trough, for clamping said troughs together, and the pivotal connection between said last mentioned jaw and said clamping member being relatively loose, to permit said last mentioned jaw to move with said lower trough and tilt against the elasticity of said clamping member, while said yieldable member and first mentioned jaw move with said upper trough, when impact loads are encountered, and to permit said yieldable member to move said troughs towards their initial positions upon removal of said impact load.

4. In a shaker conveyor and in combination with a pair of telescopic troughs, one of which is nested within the other, means for clamping said troughs together including a substantially C-shaped spring having a jaw formed on the underside of its upper end and adapted to engage the upper edge of one trough, and having another jaw adapted to engage the underside of the edge of the next trough and clamp said troughs together, said last mentioned jaw being pivotally mounted adjacent the opposite end of said spring from said first jaw, for movement with respect thereto about an axis extending longitudinally of said troughs, and the connection between said last mentioned jaw and said spring being relatively loose to permit said last mentioned jaw to tilt against said spring about an axis extending transversely of said troughs, as one trough slips with respect to the other, to tighten the connection between said troughs, upon the encountering of impact loads, and to permit said spring to restore said troughs to their initial positions, upon reversal of the load thereon.

5. In a shaker conveyor and in combination with a pair of telescopic troughs, one of which is nested within the other, means for clamping said troughs together including a substantially C-shaped member made from spring steel and having a jaw formed on the underside of its upper end, adapted to engage the upper edge of one trough, another jaw adapted to engage the underside of the edge of the next adjacent trough and clamp said troughs together, a threaded member having pivotal engagement with said C-shaped member for movement about an axis extending longitudinally of said troughs, and a screw threaded within said threaded member and having said last mentioned jaw pivotally mounted thereon, for clamping said jaws to said troughs, and said connection between said threaded member and said C-shaped member being relatively loose to permit said threaded member to tilt against the spring of said C-shaped member when said troughs encounter impact loads, and said C-shaped member serving to move said troughs towards their initial position by the elasticity therein, upon the removal of said impact load.

6. In a shaker conveyor and in combination with a pair of telescopic troughs, one of which is nested within the other, means for clamping said troughs together including a substantially C-shaped member made from spring steel and having a jaw formed on the underside of its upper end, adapted to engage the upper edge of one trough, another jaw adapted to engage the underside of the edge of the next adjacent trough and clamp said troughs together, a threaded member having pivotal engagement with said C-shaped member for movement about an axis extending longitudinally of said troughs, and a screw threaded within said threaded member and having said last mentioned jaw pivotally mounted thereon, for clamping said jaws to said troughs, said jaws each having engaging surfaces for engaging said troughs with a vise-like grip of a greater coefficient of friction than the coefficient of friction between said troughs, to permit said troughs to slip when impact loads are encountered, said pivotal connection between said threaded member and said C-shaped member being relatively loose to permit tilting of said threaded member and the jaw associated therewith against the spring of said C-shaped member, upon slipping of said troughs with respect to each other, and said C-shaped member moving said troughs towards their initial positions by the elasticity therein, upon the removal of said impact load.

LOY D. HAGENBOOK.

REFERENCES CITED

The following references are of record in the file of this patent:

UNITED STATES PATENTS

| Number | Name | Date |
| --- | --- | --- |
| 793,412 | Bliss | June 27, 1905 |
| 2,307,414 | MacPherson et al. | Jan. 5, 1943 |

FOREIGN PATENTS

| Number | Country | Date |
| --- | --- | --- |
| 29,634 | Sweden | Oct. 15, 1910 |